US009284926B2

(12) United States Patent
Miki et al.

(10) Patent No.: US 9,284,926 B2
(45) Date of Patent: Mar. 15, 2016

(54) STRADDLE TYPE VEHICLE

(71) Applicant: HONDA MOTOR CO., LTD., Tokyo (JP)

(72) Inventors: Sousuke Miki, Wako (JP); Masanori Usa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/328,961

(22) Filed: Jul. 11, 2014

(65) Prior Publication Data

US 2015/0027797 A1    Jan. 29, 2015

(30) Foreign Application Priority Data

Jul. 24, 2013   (JP) ................. 2013-153488

(51) Int. Cl.
*F02M 35/02* (2006.01)
*F02M 35/04* (2006.01)
*B62K 11/04* (2006.01)

(52) U.S. Cl.
CPC .............. *F02M 35/048* (2013.01); *B62K 11/04* (2013.01)

(58) Field of Classification Search
CPC ... F02M 35/02; F02M 35/0201; F02M 35/10; F02M 35/162
USPC ....................................................... 180/219
See application file for complete search history.

(56) References Cited

U.S. PATENT DOCUMENTS

| 4,648,474 | A | 3/1987 | Shinozaki et al. |
| 5,012,883 | A | 5/1991 | Hiramatsu |
| 7,258,186 | B2* | 8/2007 | Okabe et al. ................. 180/219 |
| 7,264,072 | B2* | 9/2007 | Yoshikawa et al. .......... 180/68.3 |
| 7,380,624 | B2* | 6/2008 | Momosaki .................... 180/68.3 |
| 7,779,950 | B2* | 8/2010 | Hoeve et al. ................. 180/219 |
| 7,883,136 | B2* | 2/2011 | Tomolillo et al. ............ 296/78.1 |
| 8,096,381 | B2* | 1/2012 | Castellani et al. ............ 180/219 |
| 2008/0190683 | A1 | 8/2008 | Hoeve |
| 2010/0193275 | A1* | 8/2010 | Song et al. ................... 180/219 |
| 2013/0146012 | A1* | 6/2013 | Tanaka ...................... 123/184.53 |

FOREIGN PATENT DOCUMENTS

| JP | 60-229882 A | 11/1985 |
| JP | 10-329776 A | 12/1998 |
| JP | 2005-219742 A | 8/2005 |
| JP | 2006-046301 A | 2/2006 |

* cited by examiner

*Primary Examiner* — Joseph Rocca
*Assistant Examiner* — Michael Stabley
(74) *Attorney, Agent, or Firm* — Squire Patton Boggs (US) LLP

(57) ABSTRACT

Straddle type vehicle takes traveling wind into a space between paired left and right main frames. Air is introduced to an air cleaner arranged between the paired left and right main frames. The paired main frames include left and right U-shaped portions having U-shaped cross sections opened inward in the vehicle width direction and constituting a part of an air cleaner case. Hollow left and right frame portions are provided below the left and right U-shaped portions, and the air cleaner is arranged between the left and right U-shaped portions.

20 Claims, 7 Drawing Sheets

STRADDLE TYPE VEHICLE

BACKGROUND

1. Field

The present invention relates to improvement of a straddle type vehicle equipped with an air cleaner.

2. Description of the Related Art

A type of straddle type vehicle is known in which an opening for taking in air is provided in the vicinity of a head pipe, and air taken in from the opening is introduced to an air cleaner arranged between paired left and right main frames (see, for example, FIG. 4 of Japanese Patent Publication No. 2006-46301 (Patent Document 1)).

As shown in FIG. 4 of Patent Document 1, a body frame (1) (the bracketed number indicates a reference numeral used in Patent Document 1; the same shall apply hereinafter.) includes a head box (3) integrally including a head pipe portion (2) and having a Y shape in plan view, and paired left and right main frames (5, 5) joined to a bifurcated rear portion of the head box (3). An air intake duct (35) is connected to a front end opening (3a) of the head box (3). Air taken in from a front end opening (35a) of the air intake duct (35) passes through the air intake duct (35), is exhausted from its rear end opening (35b), and is introduced to an air cleaner (20) arranged between the paired left and right main frames (5, 5).

The paired left and right main frames are preferably formed hollow to ensure frame rigidity and reduce weight. In some cases, an air cleaner of a large capacity is required in such a structure where the air cleaner is arranged between the hollow and highly rigid paired left and right main frames. However, if a larger capacity air cleaner is to be arranged between the hollow frames, the dimension of the paired left and right main frames will be increased in the vehicle width direction, which may lead to increase in the vehicle width.

It is desired to develop a straddle type vehicle capable of ensuring preferred frame rigidity and sufficient capacity in the air cleaner while avoiding drastic increase in the vehicle width.

SUMMARY

An object of the present invention is to provide a straddle type vehicle capable of ensuring preferred frame rigidity and sufficient capacity in the air cleaner while avoiding drastic increase in the vehicle width.

The invention according to a first embodiment includes a straddle type vehicle including a head pipe, paired left and right main frames branching into left and right vehicle width directions from the head pipe and extending toward the vehicle rear, and an opening provided in the vicinity of the head pipe for taking in traveling wind to introduce air from the opening to an air cleaner arranged between the paired left and right main frames. The paired left and right main frames include left and right U-shaped portions having U-shaped cross sections opened inward in the vehicle width direction and constituting a part of an air cleaner case, and hollow left and right frame portions provided below the left and right U-shaped portions, and the air cleaner is arranged between the left and right U-shaped portions.

The invention according to another embodiment is such that the left and right U-shaped portions are configured of left and right ceiling portions extending inward in the vehicle width direction, left and right wall portions extending downward from outer ends of the left and right ceiling portions, and left and right floor portions extending inward in the vehicle width direction from bottom ends of the left and right wall portions. The air cleaner has a cleaner case cover, and the left and right ceiling portions include an attachment hole for attaching the cleaner case cover from above. The cleaner case cover is attached to the left and right ceiling portions by inserting a fastening member into the attachment hole.

The invention according to another embodiment is such that the left and right floor portions are connected at a connecting portion, and the connecting portion together with the left and right floor portions form a connecting bottom portion. A vehicle front end of the connecting bottom portion continues to a bottom portion of the opening. A vehicle rear end of the connecting bottom portion continues to the rear end of the air cleaner. Front portions of the left and right ceiling portions are connected to form a connecting ceiling portion, and a vehicle front end of the connecting ceiling portion continues to a ceiling portion of the opening.

The invention according to another embodiment is such that paired left and right main frames branch into left and right vehicle width directions from a head pipe and extend toward the vehicle rear. An engine is provided below the paired left and right main frames, and an air cleaner constituting an intake system of the engine is provided between the paired left and right main frames. The paired left and right main frames include a plate-shaped connecting bottom portion bridged across the paired left and right main frames, left and right outer wall portions extending upward and downward from the plate-shaped connecting bottom portion, and left and right inner wall portions extending downward from the plate-shaped connecting bottom portion inside the left and right outer wall portions in the vehicle width direction. The air cleaner has an air cleaner case, and the air cleaner case is arranged above the plate-shaped connecting bottom portion.

The invention according to another embodiment is such that a first hole portion is provided in the connecting bottom portion, and a funnel for taking air into the engine is arranged so as to penetrate the first hole portion. One end of the funnel is connected to the engine, and the other end of the funnel is arranged inside the air cleaner.

The invention according to another embodiment is such that a convex portion is provided in a top surface of the left and right ceiling portions. A concave portion to be fitted with the convex portion is provided in the cleaner case cover, and an O ring is provided between the convex portion and the concave portion.

The invention according to another embodiment is such that the air cleaner includes a cleaner filter. One end of the cleaner filter is locked onto a first locking portion formed in the paired left and right main frames, and the other end of the cleaner filter is locked onto a second locking portion formed in the air cleaner case.

The invention according to another embodiment is such that a second hole portion is provided in the connecting bottom portion at a position below the connecting ceiling portion and closer to the vehicle front than the cleaner filter. The second hole portion communicates into hollow portions of the frame portions.

The invention according to another embodiment is such that the engine is supported by bottom ends of the left and right main frames and rear ends of the left and right main frames, and the bottom ends of the left and right main frames support the engine through a first fastening bolt extending in the vehicle width direction. The rear ends of the left and right main frames support the engine through a second fastening bolt extending parallel to the axial direction of the head pipe.

In some embodiments, the paired left and right main frames include the left and right U-shaped portions opened inward in the vehicle width direction and having U-shaped cross sections, and the space between the left and right U-shaped portions constitutes a part of the air cleaner case. In other words, the U-shaped spaces are used as a part of the air cleaner case, so that sufficient capacity can be ensured in the air cleaner while avoiding drastic increase in the vehicle width.

The paired left and right main frames also include the left and right frame portions having hollow cross sections, below the left and right frame portions having the U-shaped cross sections. Preferred frame rigidity can be ensured easily by using the left and right frame portions of this structure. Consequently, it is possible to provide a straddle type vehicle capable of ensuring preferred frame rigidity and sufficient capacity in the air cleaner while avoiding drastic increase in the vehicle width.

In some embodiments, the left and right U-shaped portions have the attachment holes for attaching the cleaner case cover from above, and the fastening members are fastened to the attachment holes from above. As compared to a structure where the fastening member is fastened to the attachment hole from the side, for example, the cleaner case cover can be attached to the main frames with the cleaner case cover less spread out in the vehicle width direction.

Additionally, the left and right ceiling portions have the attachment holes, and the air cleaner case is attached from above to these attachment holes by use of the fastening members. When attaching the air cleaner case, the air cleaner case is set from above onto the left and right ceiling portions, and the fastening members are fastened from above. When detaching the air cleaner case, the air cleaner case can be easily detached by taking off the fastening members from above. In other words, the air cleaner case can be attached and detached from above, and thus the air cleaner case is more easily attached and detached. Consequently, maintainability of the air cleaner can be improved.

In certain embodiments, the left and right floor portions are connected at the lower connecting portion to form the connecting bottom portion, and the front portions of the left and right ceiling portions are connected to form the connecting ceiling portion. Specifically, a closed space is formed at the front of the U-shaped portions, and the closed space allows parts of the main frames to function as a part of the air cleaner. As a result, the air cleaner case can be made smaller than a case where a closed space is formed separately.

In certain embodiments, the paired left and right main frames include the plate-shaped connecting bottom portion, the left and right outer wall portions extending upward and downward from the plate-shaped connecting bottom portion, and the left and right inner wall portions extending downward from the plate-like connecting bottom portion. Here, the part above the plate-shaped connecting bottom portion is used as the air cleaner case.

Since the air cleaner case is arranged above the plate-shaped connecting bottom portion not including the left and right inner wall portions, it is possible to ensure sufficient capacity in the air cleaner as compared to a structure where the air cleaner case is arranged inside the left and right inner wall portions. Moreover, since the part below the plate-shaped connecting bottom portion includes the left and right inner wall portions and the left and right outer wall portions, frame rigidity can be enhanced.

In certain embodiments, the first hole portion is provided in the connecting bottom portion, and the funnel for taking air into the engine is arranged so as to penetrate the first hole portion. Specifically, forming the first hole portion in the vicinity of and above the engine and inserting the funnel through the first hole portion can shorten the intake passage to the engine. As a result, intake loss can be reduced.

In certain embodiments, a convex portion is provided on a top surface of the left and right U-shaped portions, a concave portion to be fitted with the convex portion is provided in the cleaner case cover, and the O ring is interposed between the convex portion and the concave portion. Such an O ring enhances the seal performance between the main frames and the cleaner case cover.

Additionally, when attaching the cleaner case cover, the cleaner case cover can be located only by fitting the concave portion of the cleaner case cover into the convex portion of the main frame. As a result, the operation of setting the cleaner case cover is made easier.

In some embodiments, the one end of the cleaner filter is locked onto the first locking portion formed in the main frames, and the other end of the cleaner filter is locked onto the second locking portion formed in the air cleaner case. To be specific, the cleaner filter is supported when the detachable air cleaner case is attached, and the cleaner filter can be detached merely by detaching the air cleaner case. Consequently, maintainability of the cleaner filter can be improved.

In some embodiments, the second hole portion is provided in the connecting bottom portion in front of the cleaner filter, and communicates into the hollow portions formed in the frame portions. A part of intake air passes through the second hole portion and into the hollow portions, so that the hollow portions of the frame portions can function as a resonator.

In some embodiments, the rear ends of the left and right main frames support the engine through the second fastening bolt extending parallel to the axial direction of the head pipe. By making the axial direction of the head pipe coincide with the axial direction of the second fastening bolt, it is possible to bore holes for the head pipe and for the second fastening bolt without changing stages. As a result, work productivity can be improved, and work cost can be reduced.

DETAILED DESCRIPTION

Figure 1:
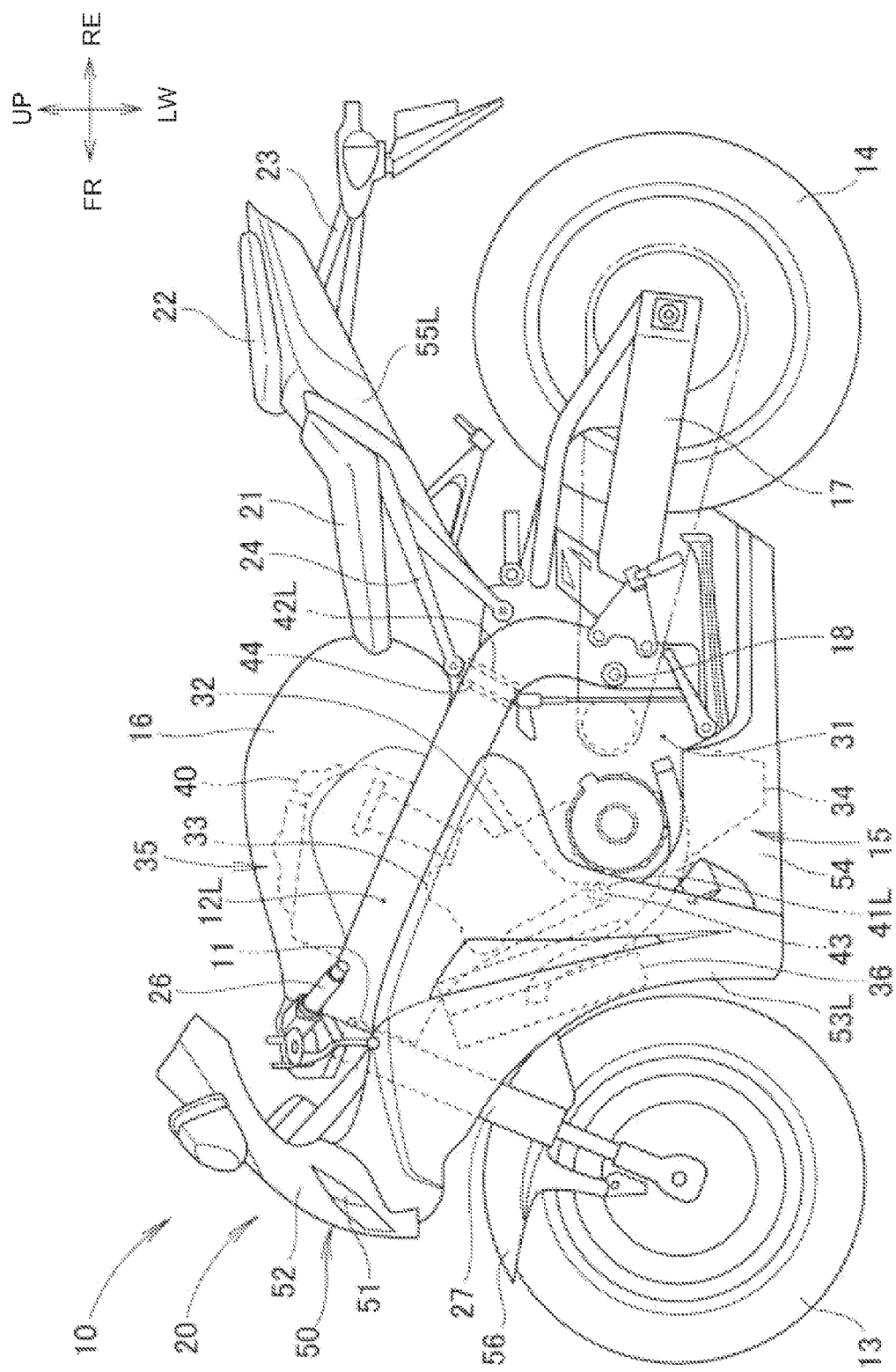
FIG. 1 is a left side view of a motorcycle according to the present invention.

Hereinafter, a detailed description will be given of embodiments of the present invention. In the drawings and example, each of "upper," "lower," "front," "rear," "left," and "right" indicates a direction viewed by a rider riding the motorcycle.

As shown in FIG. 1, a motorcycle 10 is an example of a straddle type vehicle including a head pipe 11 steerably supporting a front wheel 13, and paired left and right main frames 12L, 12R (FIG. 1 shows only reference numeral 12L on the near side) branching into left and right vehicle width directions from the head pipe 11 and extending toward the vehicle rear to support an engine 15. A fuel tank 16 is attached thereto.

A pivot portion 18 formed in rear portions of the paired left and right main frames 12L, 12R and swingably supporting a rear swing arm 17 and a rear wheel 14. A rear frame 24 extending upward in the rear direction of the vehicle from rear upper portions of the paired left and right main frames 12L, 12R to support a rider's seat 21, a passenger's seat 22, and a license plate stay 23.

A body frame 20 is configured of the head pipe 11, the paired left and right main frames 12L, 12R extending rearward in left and right directions from the head pipe 11, and the rear frame 24 extending rearward from the paired left and right main frames 12L, 12R. A handle 26 for steering the front wheel 13 is turnably attached to the head pipe 11, a front fork 27 integrally extends obliquely downward in the front direction from the handle 26, and the front wheel 13 is rotatably attached to the bottom end of the front fork 27.

The engine 15 includes a crankcase 31, a cylinder block 32, and cylinder head 33 which extend upward in the front direction in this order from the crankcase 31. An oil pan 34 extends downward from a bottom portion of the crankcase 31. An intake system 35 is disposed above the cylinder head 33, and a radiator unit 36 is installed in a standing manner in front of the cylinder block 32 and cylinder head 33, and behind the front wheel 13. An air cleaner 40, being a component of the intake system 35 of the engine 15, is disposed between the paired left and right main frames 12L, 12R. Description of the exhaust system is omitted.

The engine 15 is supported by bottom ends 41L, 41R of the left and right main frames 12L, 12R (FIG. 1 shows only reference numeral 41L on the near side) and rear ends 42L, 42R of the left and right main frames 12L, 12R (FIG. 1 shows only reference numeral 42L on the near side). To be more precise, the bottom ends 41L, 41R of the left and right main frames 12L, 12R support the engine 15 through first fastening bolts 43, 43 extending in the vehicle width direction (FIG. 1 shows only reference numeral 43 on the near side), and the rear ends 42L, 42R of the left and right main frames 12L, 12R support the engine 15 through second fastening bolts 44, 44 extending parallel to the axial direction of the head pipe 11 (FIG. 1 shows only reference numeral 44 on the near side).

Body cover 50 includes an upper cowl 52 covering the vehicle front and having a head light 51, and left and right front cowls 53L, 53R extending downward and rearward from the bottom end of the upper cowl 52 to cover sides of the engine 15 (FIG. 1 shows only reference numeral 53L on the near side). An under cowl 54 extends rearward from lower portions of the left and right front cowls 53L, 53R to cover a lower portion of the engine 15. Rear cowls 55L, 55R are provided in the vehicle rear to cover sides of the passenger seat 22 (FIG. 1 shows only reference numeral 55L on the near side). A front fender 56 for avoiding dirt from the front wheel 13 is provided to the front fork 27.

Next, a description is given of a structure of the air cleaner 40 using the body frame 20.

Figure 2:
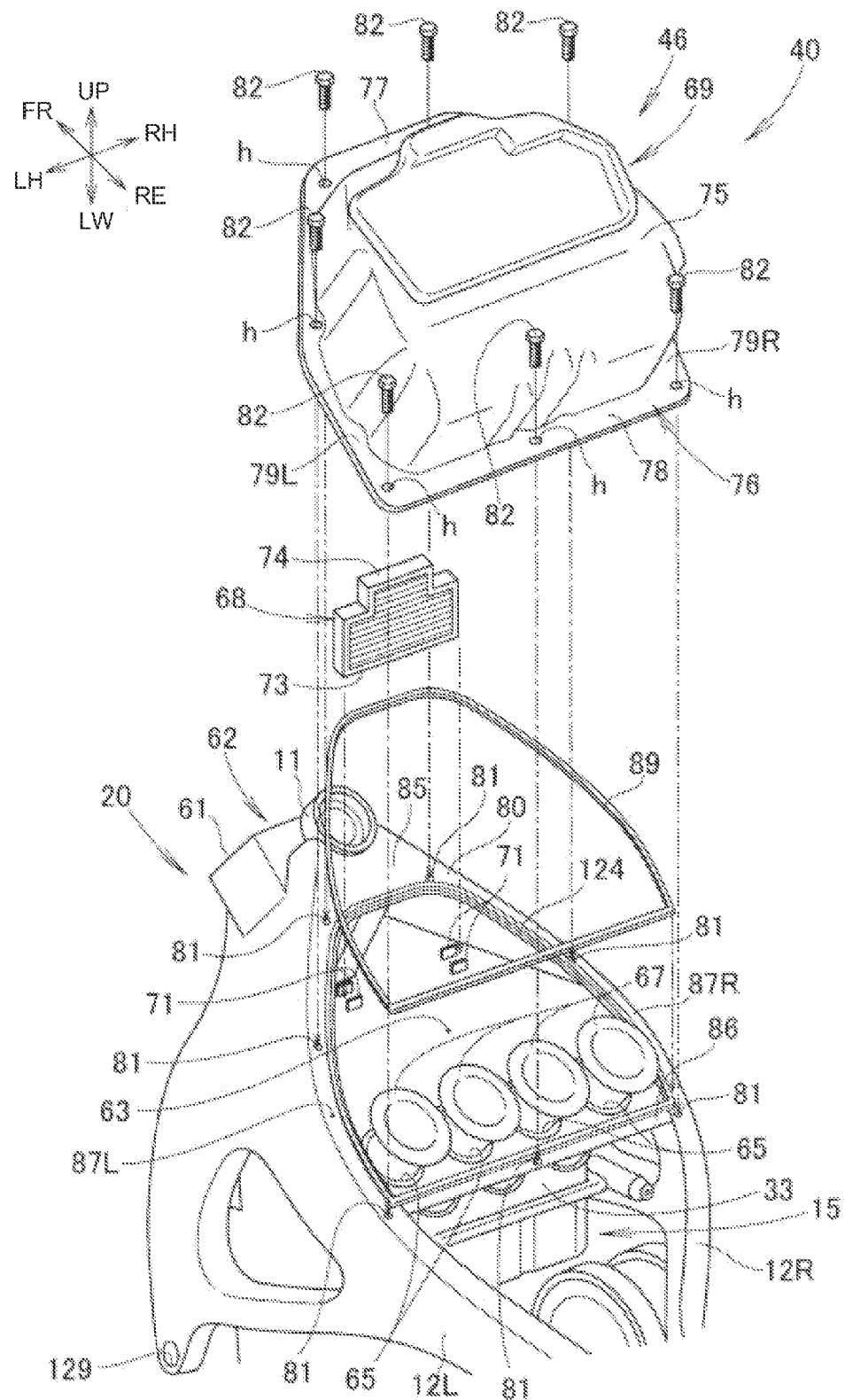
FIG. 2 is an exploded perspective view of an air cleaner according to the present invention.

As shown in FIG. 2, the paired left and right main frames 12L, 12R include a box-shaped member 62 having an opening 61 in its front end to take in traveling wind, and a plate-shaped connecting bottom portion 63 bridged across the paired left and right main frames 12L, 12R. Four first hole portions 65 as exhaust ports for exhausting traveling wind are provided in a rear portion of the connecting bottom portion 63, and a funnel 67 of the engine 15 is arranged in each of the first hole portions 65.

The air cleaner 40 includes the paired left and right main frames 12L, 12R configured in the aforementioned manner. A cleaner filter 68 engages with the paired left and right main frames 12L, 12R, and a cleaner case cover 69 covers the paired left and right main frames 12L, 12R.

The four funnels 67 to be intake passages to the engine 15 are arranged side by side in the vehicle width direction on the connecting bottom portion 63 bridged across the paired left and right main frames 12L, 12R. Each of the four funnels 67 penetrates the connecting bottom portion 63 and is connected to the cylinder head 33 of the four-cylinder engine 15.

Figure 3:
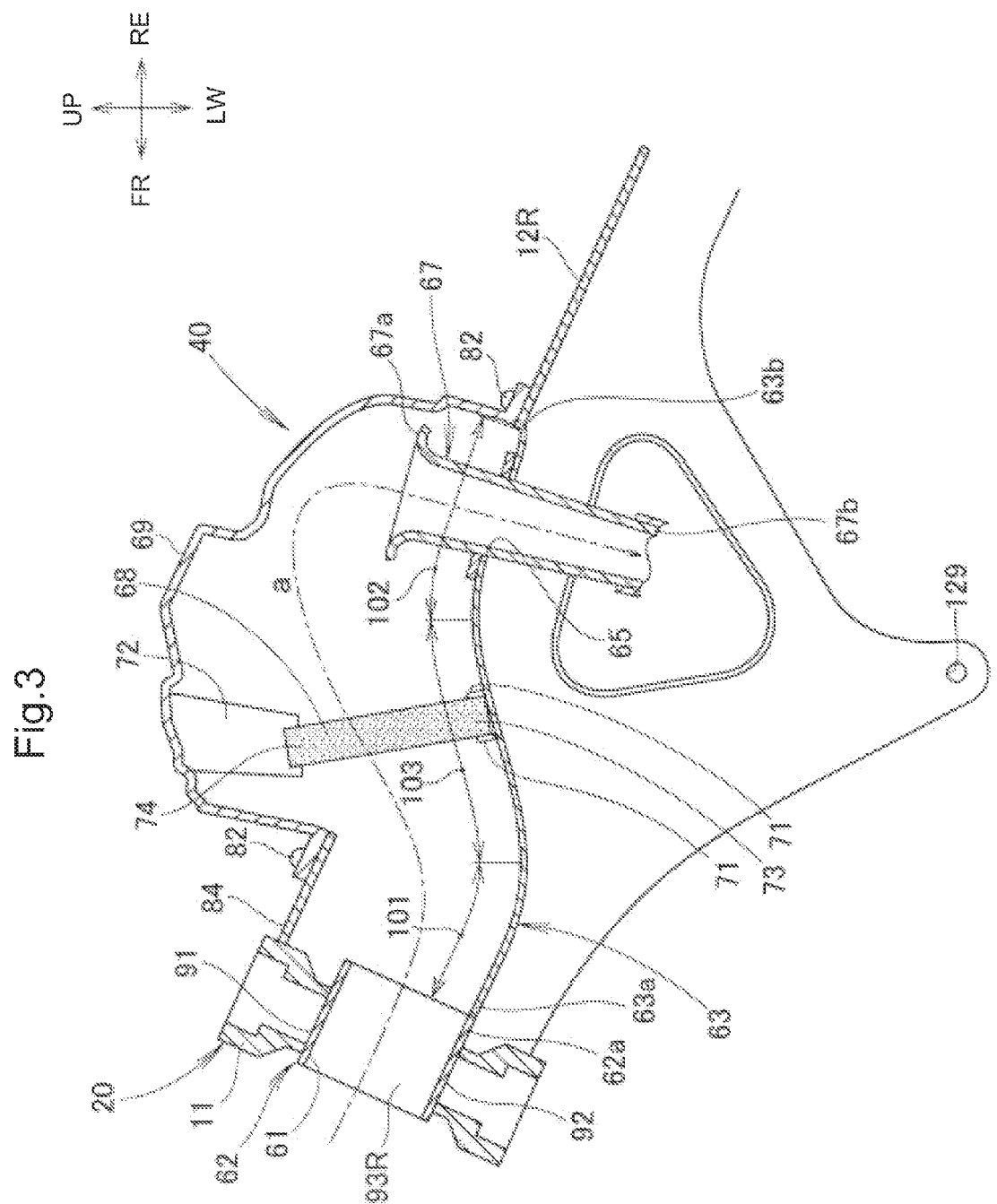
FIG. 3 is a cross sectional view of a chief part of the air cleaner viewed in the longitudinal direction of the vehicle.

A claw-shaped first locking portion 71 configured to lock the cleaner filter 68, is provided in the connecting bottom portion 63. An end (bottom end 73) of the cleaner filter 68 can be locked onto the first locking portion 71. As shown in FIG. 3, the one end (bottom end 73) of the cleaner filter 68 in the air cleaner 40 is locked onto the first locking portion 71 formed in the connecting bottom portion 63 of the paired left and right main frames 12L, 12R, and the other end (top end 74) of the cleaner filter 68 is locked onto a second locking portion 72 formed in the cleaner case cover 69.

Multiple attachment holes 81 for attaching the cleaner case cover 69 from above are formed in a ceiling portion 80 of the paired left and right main frames 12L, 12R, so that the cleaner case cover 69 can be attached to the sealing portion 80 with fastening members 82 inserted into the attachment holes 81. The cleaner case cover 69 includes a bulging portion 75 bulging upward, and a flange portion 76 surrounding the periphery of the bottom end of the bulging portion 75 and having hole portions h into which the fastening members 82 are inserted. The flange portion 76 is configured of a front flange 77, a rear flange 78, and left and right flanges 79L, 79R respectively bridged across both ends of the front flange 77 and the rear flange 78 in the vehicle width direction (see FIG. 2).

When attaching the cleaner case cover 69 to the ceiling portion 80 of the paired left and right main frames 12L, 12R, the front flange 77 is aligned with a connecting ceiling portion 85 of the paired left and right main frames 12L, 12R, the rear flange 78 is aligned with a connecting rear ceiling portion 86 of the paired left and right main frames 12L, 12R, the left flange 79L is aligned with a left ceiling portion 87L of the left main frame 12L, and the right flange 79R is aligned with a right ceiling portion 87R of the right main frame 12R.

Here, the ceiling portion 80 of the paired left and right main frames 12L, 12R is configured of the connecting ceiling portion 85, the connecting rear ceiling portion 86, the left ceiling portion 87L, and the right ceiling portion 87R. An O ring 89 as a sealing member is interposed between the flange portion 76 and the ceiling portion 80 along the entire periphery of the ceiling portion 80. Details of a fastening structure using the fastening members 82 and of a sealing structure will be described later.

The cleaner case cover 69 is attached to the ceiling portion 80 of the paired left and right main frames 12L, 12R from above, and thus the cleaner case cover 69 and the connecting bottom portion 63 disposed behind the box-shaped member 62 form an air cleaner case 46 supplying air to the engine 15.

Next, a description is given of the structure of the air cleaner 40 in a cross section of the vehicle in its longitudinal direction.

As shown in FIG. 3, a part of the paired left and right main frames 12L, 12R (FIG. 3 shows only reference numeral 12R on the far side) around the head pipe 11 except for the head pipe 11 itself is notched, the box-shaped member 62 is inserted into the notched part and joined to the paired left and right main frames 12L, 12R, and thus an air passage is formed inside the box-shaped member 62. The air passage is formed so as to penetrate the paired left and right main frames 12L, 12R around the head pipe 11.

The box-shaped member 62 is a member having a rectangular cross section, and includes a top plate 91, a bottom plate 92 arranged opposite to the top plate 91, a left plate 93L bridged across the top and bottom left ends of the top plate 91, and a right plate 93R bridged across the top and bottom right ends of the top plate 91 (FIG. 3 shows only reference numeral 93R on the far side). The connecting bottom portion 63 of the main frames 12L, 12R extends rearward from the rear end of the bottom plate 92 smoothly and continuously. A front end 63a of the connecting bottom portion 63 is continuous with the bottom plate 92 formed in the box-shaped member 62 and constituting the bottom portion of the opening 61, which faces the front side of the vehicle. A rear end 63b of the connecting bottom portion 63 continues to the rear end of the air cleaner 40.

The connecting bottom portion 63, extending at the bottom of the air cleaner 40, includes a first rearwardly-inclined portion 101 connected smoothly to a rear end 62a of the box-shaped member 62 and inclined obliquely downward in the rear direction. A frontwardly-inclined portion 103 is connected smoothly to the rear end of the first rearwardly-inclined portion 101 and is inclined obliquely upward in the rear direction. A second rearwardly-inclined portion 102 is connected smoothly to the rear end of the frontwardly-inclined portion 103 and is inclined obliquely downward in the rear direction. The cleaner filter 68 is installed substantially orthogonally in a standing manner in the frontwardly-inclined portion 103, and the funnels 67 for taking air into the engine 15 (see FIG. 1) are installed substantially orthogonally in the second rearwardly-inclined portion 102.

The first hole portion 65 is provided in the second rearwardly-inclined portion 102 of the connecting bottom portion 63, the funnel 67 is arranged so as to penetrate the first hole portions 65, one end (bottom end 67b) of the funnel 67 is connected to the engine 15 (see FIG. 1), and the other end (top end 67a) of the funnel 67 is arranged inside the air cleaner 40. The funnel 67 is a funnel-shaped tubular member having a large inner diameter at the top end 67a on the air inlet side, and having an inner diameter smaller than that of the top end 67a at the bottom end 67b on the air outlet side.

Since the first rearwardly-inclined portion 101, the forwardly-inclined portion 103, and the second rearwardly-inclined portion 102 constituting the connecting bottom portion 63 are smoothly continuous with one another, air can flow smoothly above the connecting bottom portion 63. In addition, since the cleaner filter 68 is installed substantially orthogonally in a standing manner in the frontwardly-inclined portion 103, air can be filtered efficiently by effectively using the entire surface of the cleaner filter 68.

Next, an effect of the air cleaner 40 is described. Air (traveling wind) having entered the opening 61 passes through the box-shaped member 62, is guided by the connecting bottom portion 63 and a front connecting portion 84 arranged in an upper front portion of the connecting bottom portion 63, passes through the cleaner filter 68 so that contaminants contained therein are filtered, and is then guided by the connecting bottom portion 63 and the cleaner case cover 69 to be introduced into the funnel 67 as indicated by the arrow a in FIG. 3.

Figure 4:
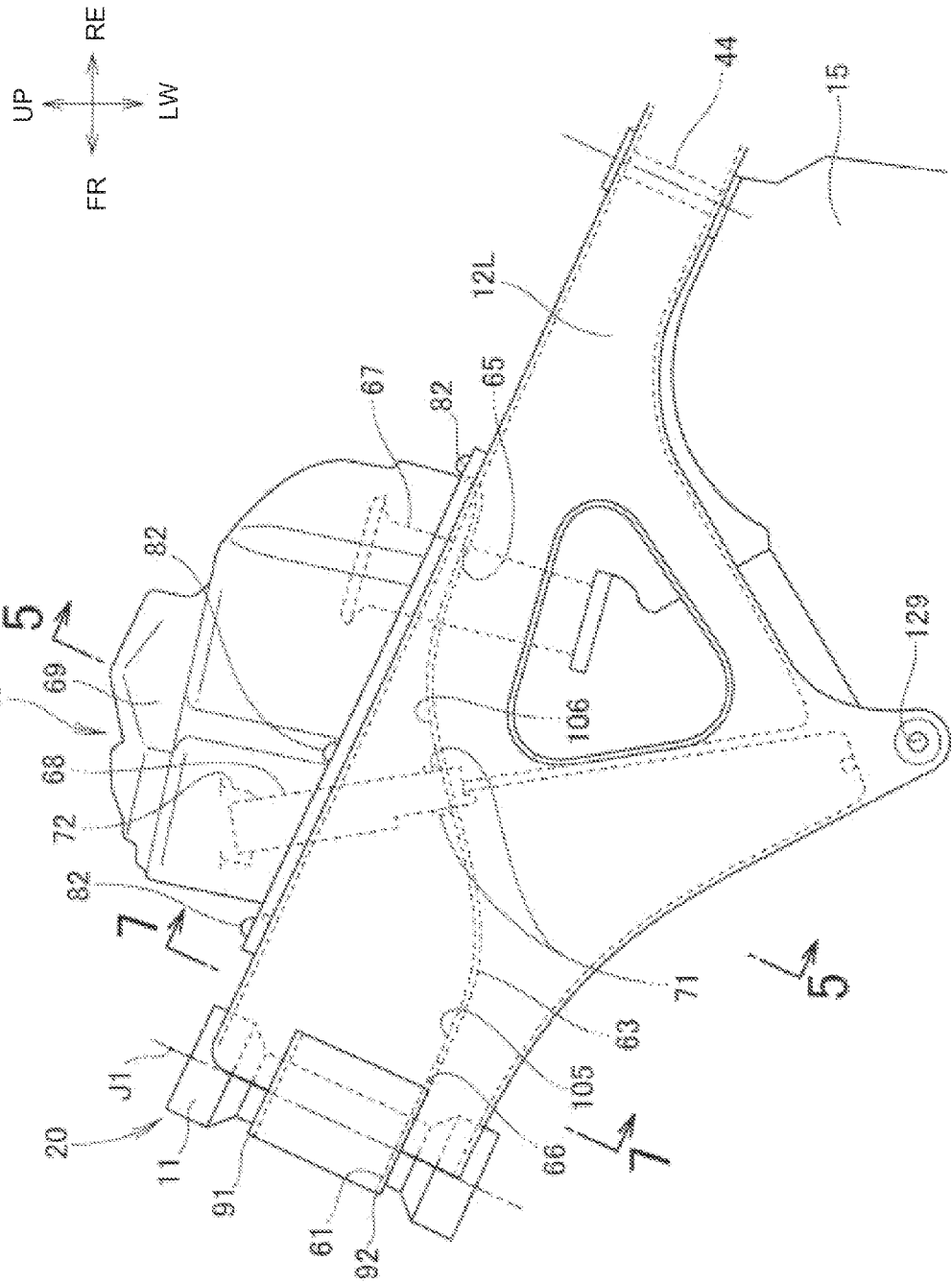
FIG. 4 is a side view of the air cleaner according to the present invention.

As shown in FIG. 4, the opening 61 is provided at the front end of the paired left and right main frames 12L, 12R, and the connecting bottom portion 63 is bridged between the bottom plate of the opening 61 (bottom plate 92) and the left and right main frames 12L, 12R to smoothly introduce taken in air. Then, the connecting bottom portion 63 is covered from the top with the cleaner case cover 69 to form a closed space, and thus the closed space is used as the air cleaner 40.

The air cleaner 40 is divided into a dirty side 105 positioned on the front side of the cleaner filter 68, and a clean side 106 positioned on the rear side of the cleaner filter 68. Second hole portions 66 are provided in the connecting bottom portion 63 on the dirty side 105. The second hole portions 66 will be described later.

Next, a description is given of the structure of the air cleaner 40 in a cross section of the vehicle in its width direction.

Figure 5:
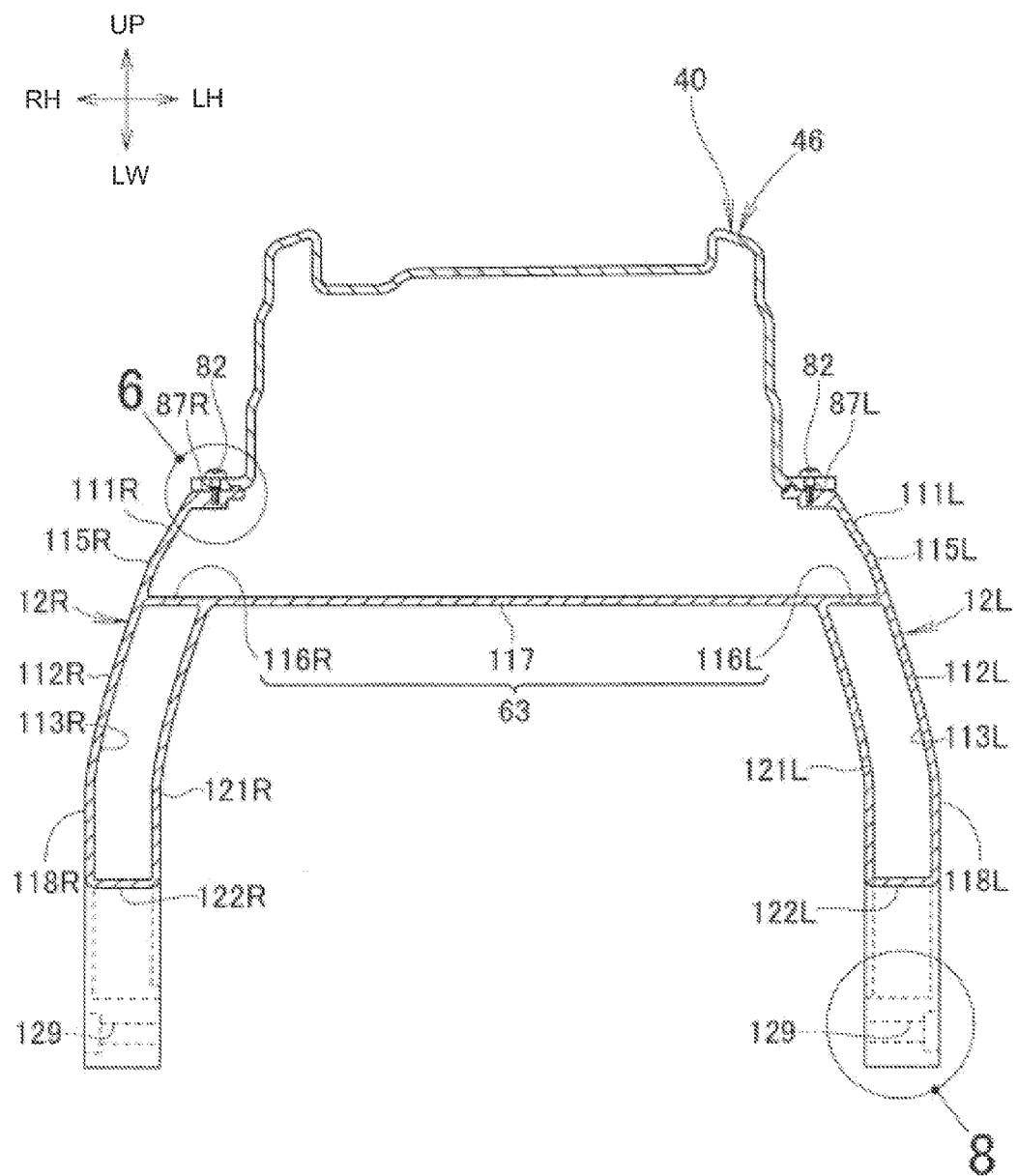
FIG. 5 is a cross sectional view taken along line 5-5 of FIG. 4.

As shown in FIG. 5, the paired left and right main frames 12L, 12R include left and right U-shaped portions 111L, 111R having U-shaped cross sections opened inward in the vehicle width direction and constituting parts of the air cleaner case 46. Hollow left and right frame portions 112L, 112R are disposed below the left and right U-shaped portions 111L, 111R. The left and right frame portions 112L, 112R have hollow portions 113L, 113R, respectively. The air cleaner 40 is arranged between the left and right U-shaped portions 111L, 111R.

The left and right U-shaped portions 111L, 111R include left and right ceiling portions 87L, 87R extending inward in the vehicle width direction. Left and right upper wall portions 115L, 115R extending downward from the outer ends of the left and right ceiling portions 87L, 87R; and left and right floor portions 116L, 116R extending inward in the vehicle width direction from the bottom ends of the left and right upper wall portions 115L, 115R. The left and right floor portions 116L, 116R are connected at a connecting portion (lower connecting portion 117), so that the lower connecting portion 117 together with the left and right floor portions 116L, 116R form the connecting bottom portion 63.

Left and right outer wall portions (left and right upper wall portions 115L, 115R and left and right lower wall portions 118L, 118R) extend upward and downward from the plate-shaped connecting bottom portion 63, while left and right inner wall portions 121L, 121R extend downward from the plate-shaped connecting bottom portion 63 inside the left and right outer wall portions (left and right lower wall portions 118L, 118R) in the vehicle width direction. Left and right bottom portions 122L, 122R are respectively bridged between the left and right inner wall portions 121L, 121R and the left and right lower wall portions 118L, 118R. The air cleaner case 46 included in the air cleaner 40 is arranged above the plate-shaped connecting bottom portion 63.

Next, a description is given of an attachment structure and the like of the cleaner case cover 69.

Figure 6:
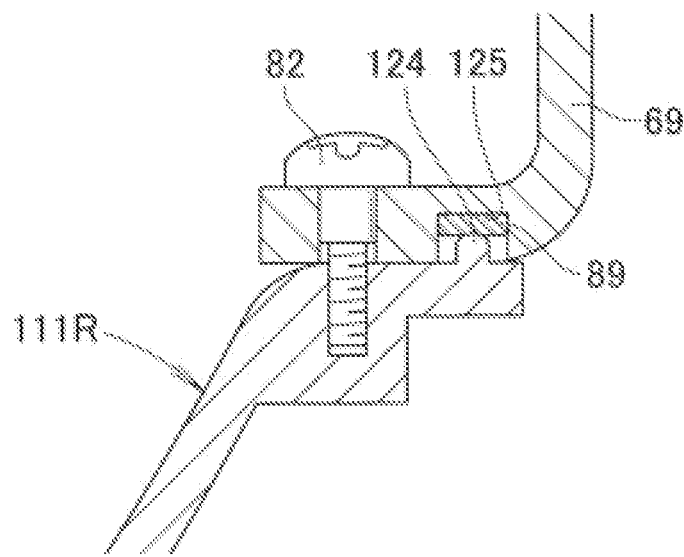
FIG. 6 is an enlarged view of part 6 in FIG. 5.

As shown in FIG. 6, a convex portion 124 is provided on a top surface of the right U-shaped portion 111R, a concave portion 125 to be fitted with the convex portion 124 is provided in the cleaner case cover 69, and the O ring 89 is interposed between the convex portion 124 and the concave portion 125.

Referring back to FIG. 2, the convex portion 124 is provided along the entire periphery of the ceiling portion 80. The O ring 89 interposed between the concave portion 125 and the convex portion 124 enhances the seal performance between the main frames 12L, 12R and the cleaner case cover 69.

Moreover, since the convex portion 124 is provided along the entire periphery of the ceiling portion 80, when attaching the cleaner case cover 69, the cleaner case cover 69 can be located on the ceiling portion 80 merely by fitting the concave portion of the cleaner case cover 69 into the convex portion 124. As a result, the operation of setting the cleaner case cover 69 is made easier.

Next, a description is given that a front portion of the paired left and right main frames 12L, 12R forming the air cleaner 40 is of a closed cross section structure.

Figure 7:
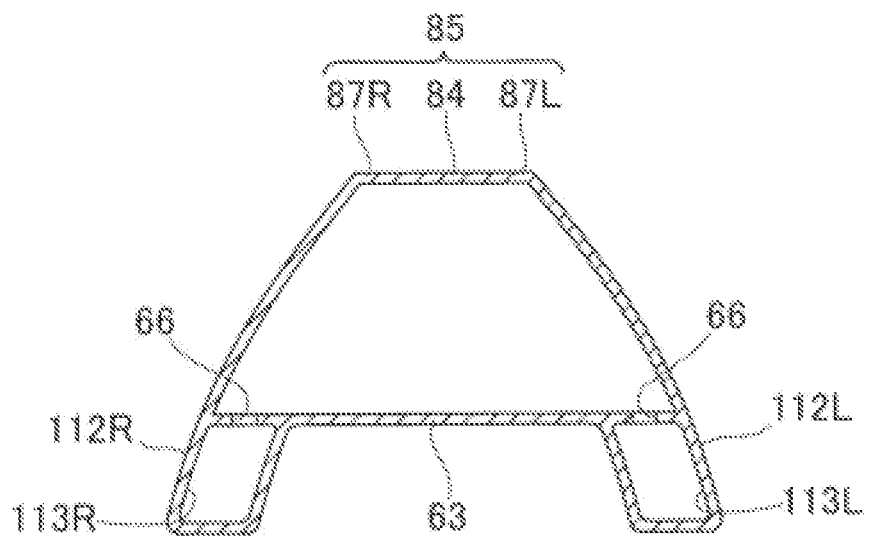
FIG. 7 is a cross sectional view taken along line 7-7 of FIG. 4.

As shown in FIG. 7, front portions of the left and right ceiling portions 87L, 87R are connected at an upper ceiling portion (front connecting portion 84), so that the front connecting portion 84 together with the front portions of the left and right ceiling portions 87L, 87R form the connecting ceiling portion 85. The second hole portions 66, 66 are provided in the connecting bottom portion 63, at a position below the connecting ceiling portion 85 and closer to the vehicle front than the cleaner filter 68 (see FIG. 4). The second hole portions 66, 66 communicate into the hollow portions 113L, 113R of the frame portions 112L, 112R.

Next, an engine support portion 127 and drain holes 128 bored in the hollow portions 113L are described.

Figure 8:
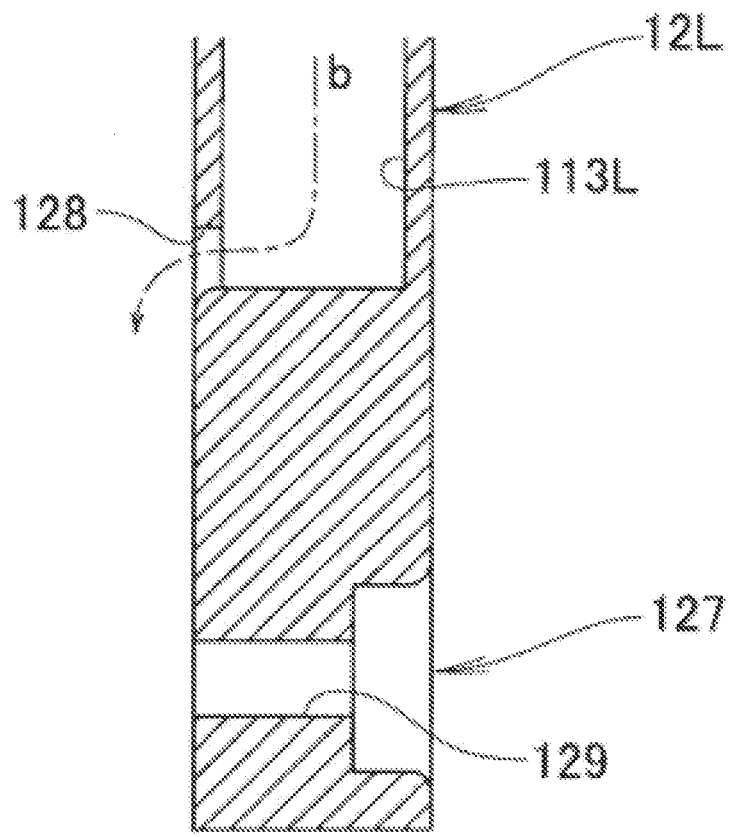
FIG. 8 is an enlarged view of part 8 in FIG. 5.

As shown in FIG. 8, a counterbored hole 129 for inserting the first fastening bolt 43 (see FIG. 1) is formed in the bottom end of the left main frame 12L. Additionally, the drain hole 128 for draining water having entered the hollow portion 113L is provided at the bottom end of the hollow portion 113 of the frame portion 112L. Water having entered the hollow portion 113L is discharged from the hollow portion 113L to the outside as indicated by arrow b in FIG. 8.

Incidentally, the engine support portion and drain holes on the right side in the vehicle width direction have structures symmetrical along the center in the vehicle width direction, and thus description is omitted.

Hereinafter, effects of the above-mentioned straddle type vehicle will be described.

Referring back to FIG. 5, the paired left and right main frames 12L, 12R include the left and right U-shaped portions 111L, 111R opened inward in the vehicle width direction and having U-shaped cross sections, and the space between the left and right U-shaped portions 111L, 111R constitutes a part of the air cleaner case 46. In other words, the U-shaped spaces are used as a part of the air cleaner case 46, so that sufficient capacity can be ensured in the air cleaner 40 while avoiding drastic increase in the vehicle width.

The paired left and right main frames 12L, 12R also include the left and right frame portions 112L, 112R having hollow cross sections, below the left and right U-shaped portions 111L, 111R having the U-shaped cross sections. Preferred frame rigidity can be ensured easily by using the left and right frame portions 112L, 112R of this structure. Consequently, it is possible to provide a straddle type vehicle capable of ensuring sufficient capacity in the air cleaner 40 as well as preferred frame rigidity while avoiding drastic increase in the vehicle width.

The paired left and right main frames 12L, 12R include the plate-shaped connecting bottom portion 63, the left and right outer wall portions (left and right wall portions 115L, 115R) extending upward and downward from the plate-shaped connecting bottom portion 63, and the left and right inner wall portions 121L, 121R extending downward from the plate-like connecting bottom portion 63. Here, the part above the plate-shaped connecting bottom portion 63 is used as the air cleaner case 46.

Since the air cleaner case 46 uses the part above the plate-shaped connecting bottom portion 63 not including the left and right inner wall portions 121L, 121R, it is possible to ensure sufficient capacity in the air cleaner 40. Moreover, since the part below the plate-shaped connecting bottom portion 63 includes the left and right inner wall portions 121L, 121R and the left and right outer wall portions (left and right lower wall portions 118L, 118R), frame rigidity can be enhanced.

Referring back to FIG. 3, the first hole portions 65 are provided in the connecting bottom portion 63, and the funnels 67 for taking air into the engine 15 are arranged so as to penetrate the first hole portions 65. Specifically, forming the first hole portions 65 in the vicinity of and above the engine 15 and inserting the funnels 67 through the first hole portions 65 can shorten the intake passage to the engine 15 (see FIG. 15). As a result, intake loss can be reduced.

Referring back to FIGS. 2 and 5, the left and right U-shaped portions 111L, 111R have the attachment holes 81 for attaching the cleaner case cover 69 from above. To be specific, the fastening member 82 is fastened to the attachment hole 81 from above. As compared to a structure where the fastening member is fastened to the attachment hole from the side, for example, the cleaner case cover 69 can be attached to the main frames 12L, 12R with the cleaner case cover less spread out in the vehicle width direction.

Additionally, the left and right ceiling portions 87L, 87R have the attachment holes 81, and the cleaner case cover 69 is attached from above to these attachment holes 81 by use of the fastening members 82. When attaching the cleaner case cover 69, the cleaner case cover 69 is set from above onto the ceiling portion 80 including the left and right ceiling portions 87L, 87R, and the fastening members 82 are fastened from above. When detaching the cleaner case cover 69, the cleaner case cover 69 can be easily detached by taking off the fastening members 82 from above. In other words, the air cleaner case 46 can be attached and detached from above, and thus the cleaner case cover 69 is more easily attached and detached. Consequently, maintainability of the air cleaner 40 can be improved.

Referring back FIGS. 4 and 7, the left and right floor portions 116L, 116R are connected at the lower connecting portion 117 to form the connecting bottom portion 63, and the front portions of the left and right ceiling portions 87L, 87R are connected to form the connecting ceiling portion 85. Specifically, a closed space is formed at the front of the U-shaped portions 111L, 111R, and the closed space allows parts of the main frames 12L, 12R to function as a part of the air cleaner 40.

Referring back to FIG. 3, the one end (bottom end 73) of the cleaner filter 68 is locked onto the first locking portion 71 formed in the main frames 12L, 12R, and the other end (top end 74) of the cleaner filter 68 is locked onto the second locking portion 72 formed in the cleaner case cover 69. To be specific, the cleaner filter 68 is supported when the detachable cleaner case cover 69 is attached, and the cleaner filter 68 can be detached merely by detaching the cleaner case cover 69. Consequently, maintainability of the cleaner filter 68 can be improved.

Referring back to FIG. 4, the second hole portions 66 are provided in the connecting bottom portion 63 in front of the cleaner filter 68, and communicate into the hollow portions 113L, 113R formed in the frame portions 112L, 112R. A part of intake air passes through the second hole portions 66 and into the hollow portions 113L, 113R, so that the hollow portions 113L, 113R of the frame portions 112L, 112R can function as a resonator.

The rear ends of the left and right main frames 12L, 12R support the engine 15 through the second fastening bolts 44, 44 extending parallel to the axial direction J1 of the head pipe 11. By making the axial direction J1 of the head pipe 11 coincide with an axial direction J2 of the second fastening bolts 44, it is possible to bore holes for the head pipe 11 and for the second fastening bolt 44 without changing stages. As a result, work productivity can be improved, and work cost can be reduced.

Note that although the present invention is applied to a motorcycle in these embodiments, it is also applicable to a straddle type tricycle, and is applicable to general straddle type vehicles.

The present invention is suitable for a motorcycle in which an air cleaner is disposed between left and right main frames.

DESCRIPTION OF REFERENCE NUMERALS

10 . . . straddle type vehicle (motorcycle), 11 . . . head pipe, 12L, 12R . . . paired left and right main frames, 15 . . . engine, 40 . . . air cleaner, 41L, 41R . . . bottom end of left and right main frames, 42L, 42R . . . rear end of left and right main frames, 43 . . . first fastening bolt, 44 . . . second fastening bolt, 46 . . . air cleaner case, 61 . . . opening, 63 . . . connecting bottom portion, 65 . . . first hole portion, 66 . . . second hole portion, 67 . . . funnel, 68 . . . cleaner filter, 69 . . . cleaner case cover, 71 . . . first locking portion, 72 . . . second locking portion, 81 . . . attachment hole, 82 . . . fastening member, 84 . . . upper ceiling portion, 85 . . . connecting ceiling portion, 87L, 87R . . . left and right ceiling portions, 89 . . . O ring, 91 . . . ceiling portion of opening (top plate), 92 . . . bottom portion of opening (bottom plate), 111L, 111R . . . left and right U-shaped portions, 112L, 112R . . . left and right frame portions, 113L, 113R . . . hollow portion, 115L, 115R . . . left and right wall portions (left and right upper wall portions), left and right upper outer wall portions, 116L, 116R . . . left and right floor portions, 117 . . . lower connecting portion, 118L, 118R . . . left and right wall portions (left and right lower wall portions), left and right lower outer wall portions, 121L, 121R . . . left and right inner wall portions, 124 . . . convex portion, 125 . . . concave portion.

The invention claimed is:

1. A straddle type vehicle, comprising:
a head pipe;
paired left and right main frames branching into left and right vehicle width directions from the head pipe and extending toward a vehicle rear; and
an opening provided in a vicinity of said head pipe configured to take in traveling wind to introduce air from the opening to an air cleaner disposed between said paired left and right main frames,
said paired left and right main frames including
left and right U-shaped portions having U-shaped cross sections opened inward in the vehicle width direction and constituting a part of an air cleaner case, and
hollow left and right frame portions provided below the left and right U-shaped portions,
wherein said air cleaner is disposed between said left and right U-shaped portions, and
wherein the left and right U-shaped portions at least partially overlap a portion of the hollow left and right frame portions.

2. A straddle type vehicle, comprising:
a head pipe;
paired left and right main frames branching into left and right vehicle width directions from the head pipe and extending toward a vehicle rear; and
an opening provided in a vicinity of said head pipe configured to take in traveling wind to introduce air from the opening to an air cleaner disposed between said paired left and right main frames,
said paired left and right main frames including
left and right U-shaped portions having U-shaped cross sections opened inward in the vehicle width direction and constituting a part of an air cleaner case, and
hollow left and right frame portions provided below the left and right U-shaped portions,
wherein said air cleaner is disposed between said left and right U-shaped portions, and
said left and right U-shaped portions comprising:
left and right ceiling portions extending inward in the vehicle width direction;
left and right wall portions extending downward from outer ends of the left and right ceiling portions; and
left and right floor portions extending inward in the vehicle width direction from bottom ends of the left and right wall portions,
wherein said air cleaner comprises a cleaner case cover, said left and right ceiling portions include an attachment hole configured to attach said cleaner case cover from above, and wherein
said cleaner case cover is attached to said left and right ceiling portions by a fastening member inserted into said attachment hole.

3. The straddle type vehicle according to claim 2, wherein:
said left and right floor portions are connected at a lower connecting portion, and the lower connecting portion together with said left and right floor portions form a connecting bottom portion,
a vehicle front end of the connecting bottom portion continues to a bottom portion of said opening,
a vehicle rear end of said connecting bottom portion continues to a rear end of said air cleaner,
front portions of said left and right ceiling portions are connected at an upper ceiling portion, and the upper ceiling portion together with said left and right ceiling portions form a connecting ceiling portion; and
wherein a vehicle front end of the connecting ceiling portion continues to a ceiling portion of said opening.

4. A straddle type vehicle, comprising:
paired left and right main frames branching into left and right vehicle width directions from a head pipe and extending toward a vehicle rear;
an engine provided below the paired left and right main frames; and
an air cleaner constituting an intake system of the engine provided between said paired left and right main frames,
said paired left and right main frames including
a plate-shaped connecting bottom portion bridged across the paired left and right main frames,
left and right outer wall portions extending upward and downward from the plate-shaped connecting bottom portion,
left and right ceiling portions extending inward in the vehicle width direction from top ends of said left and right outer wall portions, and
left and right inner wall portions extending downward from said plate-shaped connecting bottom portion inside said left and right outer wall portions in the vehicle width direction,
wherein said air cleaner includes an air cleaner case; and wherein
the air cleaner case is disposed above said plate-shaped connecting bottom portion.

5. The straddle type vehicle according to claim 3, wherein a first hole portion is provided in said connecting bottom portion, and a funnel configured to take air into the engine is disposed so as to penetrate said first hole portion, wherein
one end of the funnel is connected to said engine, and wherein another end of said funnel is disposed inside said air cleaner.

6. The straddle type vehicle according to claim 2, further comprising:
- a convex portion provided in said left and right ceiling portions;
- a concave portion to be fitted into said convex portion, provided in said cleaner case cover; and
- an O ring provided between said convex portion and said concave portion.

7. A straddle type vehicle, comprising:
- a head pipe;
- paired left and right main frames branching into left and right vehicle width directions from the head pipe and extending toward a vehicle rear; and
- an opening provided in a vicinity of said head pipe configured to take in traveling wind to introduce air from the opening to an air cleaner disposed between said paired left and right main frames,
- said paired left and right main frames including
  - left and right U-shaped portions having U-shaped cross sections opened inward in the vehicle width direction and constituting a part of an air cleaner case, and
  - hollow left and right frame portions provided below the left and right U-shaped portions,
- wherein said air cleaner is disposed between said left and right U-shaped portions,
- said air cleaner includes a cleaner filter,
- one end of said cleaner filter is locked onto a first locking portion formed in said paired left and right main frames, and
- another end of said cleaner filter is locked onto a second locking portion formed in said cleaner case cover.

8. The straddle type vehicle according to claim 7, wherein a second hole portion is provided in said connecting bottom portion at a position below said connecting ceiling portion and closer to a vehicle front than said cleaner filter, and wherein said second hole portion communicates into hollow portions of said frame portions.

9. The straddle type vehicle according to claim 4, wherein said engine is supported by bottom ends of said left and right main frames and rear ends of said left and right main frames, the bottom ends of said left and right main frames support said engine through a first fastening bolt extending in the vehicle width direction, and wherein the rear ends of said left and right main frames support said engine through a second fastening bolt extending parallel to an axial direction of said head pipe.

10. A straddle type vehicle, comprising:
- head pipe means for supporting vehicle steering components thereupon;
- left and right main frame means branching into left and right vehicle width directions from the head pipe means, and extending toward a vehicle rear; and
- opening means provided in a vicinity of the head pipe means, said opening means for taking in travelling wind and introducing air from the opening means to an air cleaner means disposed between the left and right main frame means,
- said left and right main frame means including
  - left and right U-shaped means having U-shaped cross sections opened inward in the vehicle width direction, said U-shaped means for forming part of an air cleaner case means, and
  - hollow left and right frame means disposed below the left and right U-shaped means,
- wherein the air cleaner means is disposed between the left and right U-shaped means, and
- wherein the left and right U-shaped means at least partially overlap a portion of the hollow left and right frame means.

11. A straddle type vehicle, comprising:
- head pipe means for supporting vehicle steering components thereupon;
- left and right main frame means branching into left and right vehicle width directions from the head pipe means, and extending toward a vehicle rear; and
- opening means provided in a vicinity of the head pipe means, said opening means for taking in travelling wind and introducing air from the opening means to an air cleaner means disposed between the left and right main frame means,
- said left and right main frame means including
  - left and right U-shaped means having U-shaped cross sections opened inward in the vehicle width direction, said U-shaped means for forming part of an air cleaner case means, and
  - hollow left and right frame means disposed below the left and right U-shaped means,
- wherein the air cleaner means is disposed between the left and right U-shaped means, and
- said left and right U-shaped means comprise:
- left and right ceiling means extending inward in the vehicle width direction;
- left and right wall means extending downward from outer ends of the left and right ceiling means, and
- left and right floor means extending inward in the vehicle width direction from bottom ends of the left and right wall means,
- wherein said air cleaner means includes case cover means for covering the air cleaner case means,
- said left and right ceiling means include an attachment hole for attaching the cleaner case means from above, and wherein
- the cleaner case means is attached to the left and right ceiling means by a fastening means inserted into the attachment hole.

12. The straddle type vehicle according to claim 11, wherein:
- said left and right floor means are connected at a lower connecting portion, and the lower connecting portion and the left and right floor means form a connecting bottom means,
- a vehicle front end of the connecting bottom means continues to a bottom portion of the opening,
- a vehicle rear end of the connecting bottom means continues to a rear end of said air cleaner means,
- front portions of the left and right ceiling means are connected at an upper ceiling portion, and the upper ceiling portion together with the left and right ceiling means form a connecting ceiling means, and
- wherein a vehicle front end of the connecting ceiling means continues to a ceiling portion of said opening.

13. A straddle type vehicle, comprising:
- left and right main frame means for supporting vehicle components thereupon, said left and right frame means branching into left and right vehicle width directions from a head pipe means for supporting vehicle steering components thereupon, said left and right main frame means extending toward a vehicle rear;
- engine means for providing motive force disposed below the left and right main frame means;

air cleaner means for cleaning intake air constituting an intake system of the engine means, said air cleaner means disposed between said left and right main frame means, said left and right main frame means including
a plate-shaped connecting bottom means bridged across the left and right main frame means,
left and right outer walls means extending upward and downward from the plate-shaped connecting bottom means;
left and right ceiling means extending inward in the vehicle width direction from top ends of the left and right outer wall means, and
left and right inner wall portions extending downward from said plate-shaped connecting bottom means inside said left and right outer wall means in the vehicle width direction,
wherein said air cleaner means includes an air cleaner case means, and wherein the air cleaner case means is disposed above said plate-shaped connecting bottom means.

14. The straddle type vehicle according to claim 12, wherein a first hole portion is provided in said connecting bottom means, and a funnel means for taking air into the engine means is disposed so as to penetrate said first hole portion,
wherein one end of the funnel means is connected to said engine means, and wherein another end of said funnel means is disposed inside said air cleaner means.

15. The straddle type vehicle according to claim 13, wherein a first hole portion is provided in said connecting bottom means, and a funnel means for taking air into the engine means is disposed so as to penetrate said first hole portion,
wherein one end of the funnel means is connected to said engine means, and wherein another end of said funnel means is disposed inside said air cleaner means.

16. The straddle type vehicle according to claim 11, further comprising:
a convex portion disposed in said left and right sealing means;
a concave portion for fitting into said convex portion, said concave portion provided in said cover means;
sealing means for sealing provided between said convex portion and said concave portion.

17. A straddle type vehicle, comprising:
head pipe means for supporting vehicle steering components thereupon;
left and right main frame means branching into left and right vehicle width directions from the head pipe means, and extending toward a vehicle rear; and
opening means provided in a vicinity of the head pipe means, said opening means for taking in travelling wind and introducing air from the opening means to an air cleaner means disposed between the left and right main frame means,
said left and right main frame means including
left and right U-shaped means having U-shaped cross sections opened inward in the vehicle width direction, said U-shaped means for forming part of an air cleaner case means, and
hollow left and right frame means disposed below the left and right U-shaped means,
wherein the air cleaner means is disposed between the left and right U-shaped means, and
said air cleaner means includes filter means for filtering air, wherein one end of said cleaner means is locked onto a first locking means formed in said left and right main frame means, and wherein another end of said filter means is locked onto a second locking portion disposed in said cleaner case cover means.

18. The straddle type vehicle according to claim 17, wherein a second hole portion is provided in said connecting bottom means at a position below said connecting sealing means and closer to a vehicle front than said filter means, and wherein said second hole portion communicates into hollow portions of said frame means.

19. The straddle type vehicle according to claim 13, wherein said engine means is supported by bottom ends of said left and right main frame means and rear ends of said left and right main frame means, wherein the bottom ends of the left and right main frame means support said engine means through a first fastening means extending in the vehicle width direction, and wherein the rear ends of the left and right main frame means support said engine means through a second fastening means extending parallel to an axial direction of said head pipe means.

20. The straddle type vehicle according to claim 4, wherein a first hole portion is provided in said connecting bottom portion, and a funnel configured to take air into the engine is disposed so as to penetrate said first hole portion, wherein
one end of the funnel is connected to said engine, and wherein another end of said funnel is disposed inside said air cleaner.

* * * * *